United States Patent [19]

Niwa

[11] 3,917,912

[45] Nov. 4, 1975

[54] MULTIFREQUENCY DIALING SIGNAL RECEIVER FOR PUSH-BUTTON TYPE TELEPHONE SYSTEMS

[75] Inventor: Kunihiko Niwa, Tokyo, Japan

[73] Assignee: Nippon Electric Company, Ltd., Tokyo, Japan

[22] Filed: Mar. 6, 1974

[21] Appl. No.: 448,582

[30] Foreign Application Priority Data

Mar. 6, 1973 Japan ................................ 48-26710

[52] U.S. Cl. ............................................ 179/84 VF

[51] Int. Cl.² ........................................... H04M 1/50

[58] Field of Search ............... 179/84 VF; 324/78 D

[56] References Cited

UNITED STATES PATENTS 3,790,720 2/1974 Schartmann .................... 179/84 VF

*Primary Examiner*—Kathleen H. Claffy
*Assistant Examiner*—Joseph Popek
*Attorney, Agent, or Firm*—Sughrue, Rothwell, Mion, Zinn & Macpeak

[57] ABSTRACT

A dialing signal receiver for use in a push-button type telephone system is described. In the proposed system, the multifrequency dialing signal is first divided into a pair of frequency components, a higher-frequency component and a lower-frequency component. Each of the components is then sensed by a voltage comparator only when it exceeds a preset d.c. reference voltage. The output of each of the voltage comparators is then supplied to a frequency sensing means to determine during a predetermined length of a guard time period whether the received sinal has one of the specific frequencies given to the multifrequency dialing signal and whether its frequency deviation is within a predetermined range. Only those received signal components which appear as outputs at the frequency sensing means are permitted to be supplied to a decoder, which translates the supplied signals into controlling signals for the energization of relays and other circuit elements. Thus, the present invention ensures the reliable digitalized processing of multifrequency dialing signals, and facilitates the manufacture of the signal processing circuits by the use of the integrated circuit technique.

4 Claims, 29 Drawing Figures

MULTIFREQUENCY DIALING SIGNAL RECEIVER FOR PUSH-BUTTON TYPE TELEPHONE SYSTEMS

BACKGROUND OF THE INVENTION

This invention relates to a multifrequency signal receiver for use in a push-button type telephone system and the like.

Ordinarily, in a telephone system of this type now getting wide acceptance, the dialing is effected by the use of two-frequency dialing code. This code is composed of two frequencies selected out of two groups of frequencies hereinafter referred to as the high frequency group and the low frequency group. Each group of frequencies comprises four component frequencies in the voice frequency band, and upon depression of a push button, a pair of frequencies, one selected from the high frequency group and the other selected from the low frequency group, are transmitted concurrently to a telephone exchange office.

More specifically, the low frequency group consists of 697, 770, 852, and 941 Hz, while the high frequency group consists of 1209, 1336, 1477, and 1633 Hz, and when a push button No. 1 is depressed, a pair of frequencies 697 and 1209 Hz are transmitted to the telephone exchange office.

A multifrequency signal receiver installed at the telephone exchange office receives the signal having two frequency components, and determines the depressed push button at the calling subscriber. The receiver then activates a relay corresponding to the push button to establish a line between the calling and called subscribers.

Since the multifrequency signal containing two frequency components is in the voice frequency band, the receiver described above is required to surely eliminate erroneous operations which tend to be caused by pseudo signals such as human voice and other noise. To withstand such rigorous circuit condition, strict standards are set for manufacturing the dialing signal receiver.

For instance, an article entitled "System Design of the Pushbutton Telephone Exchange System Including Variable Abbreviated Dial Service" by Kimura et al. published in Electrical Communication Laboratories Technical Journal of Nippon Telegraph & Telephone Public Corporation, Vol. 17, No. 11, 1968, pp. 2385–2386, gives the following performances as mandatory ones:

1. Frequency deviation of each component should be less than ±2.0 percent from the preset nominal values. Those components deviating beyond the tolerance of ±2.8 percent should not be accepted as the multi-frequency dialing signal component;
2. The multifrequency signal should have a level higher than −24 dBm. Those components lower than −29 dBm should not be sensed; and
3. The receiver should be capable of completing the detection of the dialing frequency components within a guard time ranging from 24 to 40 milliseconds.

The conventional multifrequency dialing signal receiver has band-rejection filters for dividing the received signal into higher and lower frequency groups, limiters for amplitude limiting the output of the filters and eight L-C tuning circuits to which the component frequency signals are applied and two of whose outputs exceeding a predetermined threshold value are detected.

However, the multifrequency signal receiver of this type is too complicated, difficult to miniaturize and costly to manufacture.

Furthermore, since the signals are processed entirely in the analog form, the maintenance and adjustment of the system are very difficult.

To overcome the above described problems, an improved multifrequency tone detector is proposed in the Japanese Patent Publication No. 32922/1972. The fundamental concept of this proposal resides in that a input multifrequency signal is separated into two component frequencies belonging to a high frequency group and a low frequency group. The two component frequency signals are then converted into rectangular waveforms, for the measurement of the time interval between the leading edges of the two successive waveforms by counting the number of clock pulses of a predetermined repetition frequency. Thus, the frequencies of the two component frequency signals are determined from the number of clock pulses counted. The proposed multifrequency tone detector of this type is superior to the conventional multifrequency signal receiver in that the principal parts of the detector can be composed of digital circuits. However, the detector still has shortcomings as follows:

1. As described before, the lowest acceptable receiving level of −24 dBm is set as a requirement. However, the proposed detector can respond to any multifrequency signal lower than that down to zero level ($-\infty dBm$);
2. While the multifrequency signal components deviating in frequency less than ±2.0% from the preset frequencies are sensed as the dialing signal, those deviating more than ±2.8% are not. Accordingly, the frequency difference between ±2.0% and ±2.8% must be detected clearly as a difference of the number of the counted clock pulses. For this purpose, the repetition frequency of the clock pulses must be extremely high.

More specifically, assuming that the frequency of the clock pulses is $f_s$, the number of clock pulses contained in one cycle period of a sinusoidal wave of a frequency $f$ is expressed as $$\left[\frac{f_s}{f}\right] \text{ or } \left[\frac{f_s}{f}\right] + 1$$

where $[x]$ designates a Gaussean notation, with $x$ denoting the greatest integer which does not exceed $x$. Since the wave and the clock pulses are not synchronized, the number of the clock pulses counted falls in the region between the above-mentioned two values.

For this reason, to discriminate the +2.0 percent deviation components from the +2.8 percent deviation components, the following relation must be satisfied:

$$\left[\frac{f_s}{f_o \times 1.02}\right] > \left[\frac{f_s}{f_o \times 1.028}\right] + 1 \qquad (1)$$

The unequalty is reduced to:

$$\left[\frac{f_s}{f_o \times 1.02}\right] - \left[\frac{f_s}{f_o \times 1.028}\right] \gtreqqless 2 \qquad (2)$$

When the value of $f_s$ satisfying the relation (2) is calculated for the case of $f_0 = 1633$ Hz, a lowest value of the $f_s$ is found to be approximately 400 KHz. At such a high clock frequency, the circuit design of the detector, and the multiplex handling of the component signals are very difficult. Furthermore, in the case where the input signal is subjected to an analog-to-digital (A/D) conversion for the digitallized processing, the encoder should be of a very high speed circuit, requiring high quality circuit components suited for high speed operation:

3. In addition, since the frequency of the clock pulses is so high, each time slot becomes extremely narrow, thus necessitating a satisfactory suppression of disturbance signals to obtain the number of clock pulses counted within the range between $$\left[\frac{f_s}{f}\right] \text{ and } \left[\frac{f_s}{f}\right] + 1$$

The multifrequency signal has two frequency components mixed together as described above. It is apparent therefore that when the two components are divided into a high frequency group and a low frequency group, the frequency determination of one component is severely affected by the leakage of the other frequency component if the latter frequency component is not sufficiently attenuated. Accordingly, a sharp band-rejection characteristic is required for each of the band-rejection filters employed for dividing the higher frequency and the lower frequency groups, thus requiring a complicated circuit construction for each of the filters. Our calculation indicates that more than 40 $dB$ of attenuation should be given to the components to be suppressed;

4. When an appreciable amount of noise is contained in the multifrequency signal, the number of clock pulses counted tends to cause erroneous operation of the detector.

SUMMARY OF THE INVENTION

In view of the above noted difficulties, a principal object of the present invention is to provide a multifrequency dialing signal receiver for use in a push-button type telephone system and the like, which is greatly simplified and yet operable to satisfy the above described requirements.

Another object of the invention is to provide a multifrequency signal receiver for use in a push-button type telephone system and the like, whose substantial part is composed of digital circuits suited for manufacture in the form of a large scale integrated circuit (LSI), and which facilitates multiplex operation.

Still another object of the invention is to provide a multifrequency signal receiver for use in a push-button type telephone system and the like, wherein the attenuation given at the high frequency and low frequency separating filters can be lowered to simplify the filter, while securing a reliable operation regardless of the presence of a certain amount of noise.

Still another object of the invention is to provide a multifrequency signal receiver of the kind described above, wherein the frequency of clock pulse is substantially lowered, thereby facilitating the multiplex operation.

According to the present invention, there is provided a multifrequency signal receiver comprising:

1. filters for separating the component frequencies of an input multifrequency signal into a low frequency group and a high frequency group (in this example it is assumed that the low frequency group consists of $f1, f2, f3$, and $f4$, and the high frequency group, $f5, f6, f7$, and $f8$);
2. a comparator circuit for comparing the output of either one of the filters with a predetermined threshold value $Vr$ (according to the hereinbefore mentioned standard, the value $Vr$ is set at an intermediate value between the peak value $4a$, $24dB$ sinusoidal wave and the peak value of a $29dBm$ sinusoidal wave) and delivers either one of "1" and "0" depending on whether the output from the filter is greater or smaller than the threshold value $Vr$;
3. a first and a third counter which count clock pulses;
4. a circuit which resets the first counter every time the output from the comparator circuit is varied from "0" to "1" (or from "1" to "0");
5. a first discrimination circuit for judging from the number counted at the first counter immediately before it is reset whether the frequency of the signal coincides with any one of the frequencies $f_i$ ($i$ = 1 through 4 for the low frequency group while $i$ = 5 through 8 for the high frequency group);
6. a second counter for counting the number of successive periods of the signal when the judgement at the first discrimination circuit indicates that the frequency coincides with one of the frequencies $f_i$;
7. a readout commanding circuit for providing an instruction to read the number of pulses counted at the third counter, after confirming the lapse of a predetermined guard time from both the output ($f_i$) of the first discrimination circuit and the output of the second counter;
8. a second discrimination circuit for carrying out a more precise measurement of the frequency ($f_i$) utilizing the pulse counter output at the third counter upon receiving the readout of the instruction from the readout commanding circuit;
9. a circuit for resetting the second and third counters when the first discrimination circuit judges that the frequency coincides with none of $f_i$ or when the second discriminating circuit judges that the frequency deviation is beyond the tolerance range; and
10. an output circuit for delivering an output for driving a relay corresponding to one of sixteen push-buttons for a predetermined period when the second discriminating circuit judges that the input frequency coincides with the preset dialing signal frequency belonging to either of the low or high frequency groups.

The above described components (2) through (9) are required in duplicate for the two circuits for processing the low and high frequency components included in the multifrequency input dialing signal.

The nature, principle, and utility of the present invention will be fully understood from the following detailed description of the invention when read in conjunction with the accompanying drawings, wherein like parts are designated by like reference numerals and characters.

BRIEF DESCRIPTION OF THE DRAWINGS

In the drawings:

FIG. 2A to 4G are diagrams showing waveforms at various parts of the circuit shown in FIG. 1;

FIG. 3 is a diagram of a circuit which can be added to the multifrequency signal receiver shown in FIG. 1 for reducing erroneous operation of the receiver;

FIGS. 4A to 4K are diagrams showing waveforms at various parts of the circuit shown in FIG. 3;

DETAILED DESCRIPTION OF THE INVENTION

Figure 1:
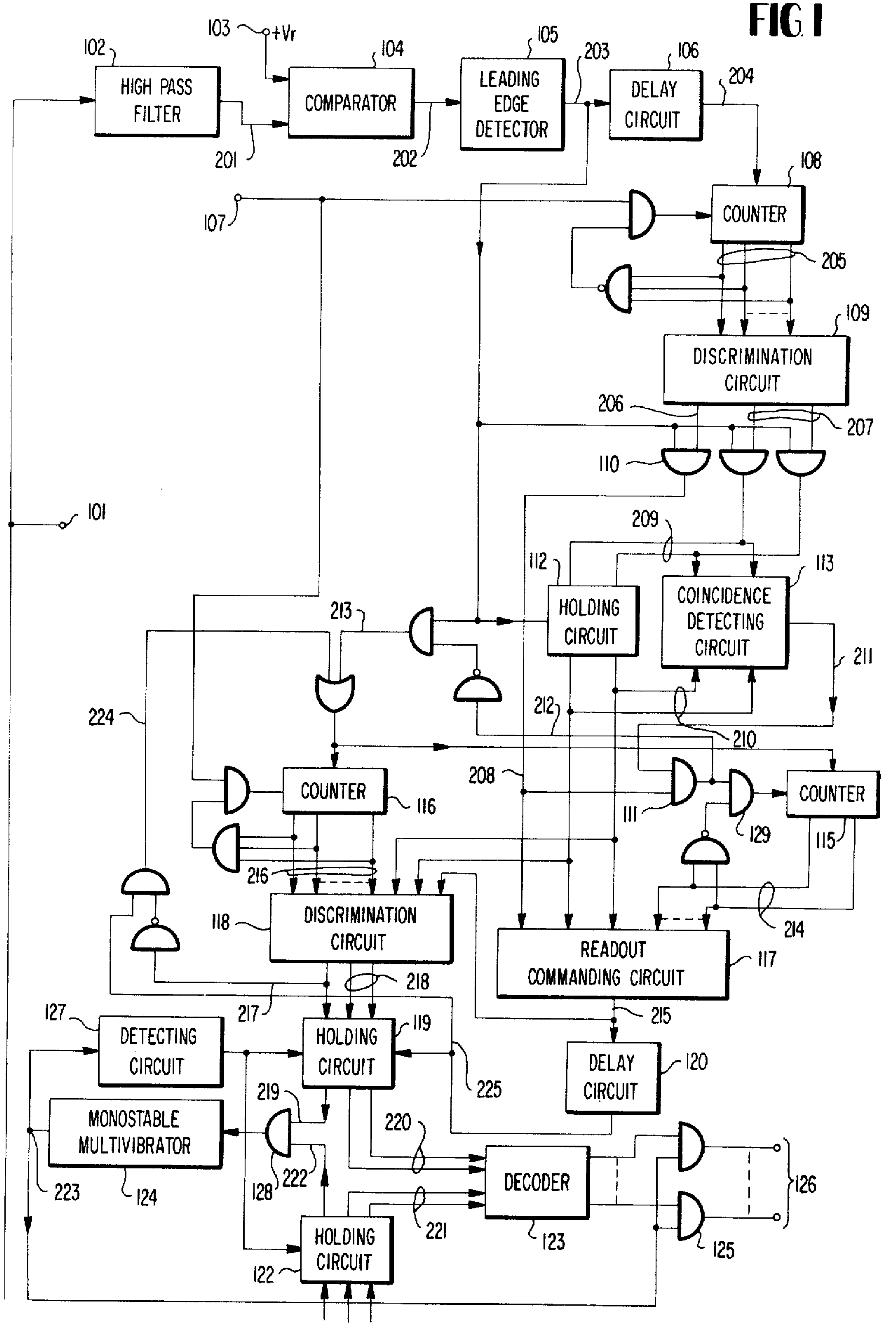
FIG. 1 is a circuit diagram showing one example of the multifrequency signal receiver according to the present invention.

Referring now to FIG. 1 showing a preferred embodiment of the present invention, the multifrequency signal receiver is provided with an input terminal 101 through which an input multifrequency signal is applied. Although the input signal is thereafter divided into a high frequency component and a low frequency component by corresponding filters and treated as hereinafter described to determine the frequencies, only one part of the circuit for handling the high fequency component is indicated in FIG. 1 for the simplicity of illustration.

Figures 2A, 2B, 2C, 2D, 2E, 2F, 2G:
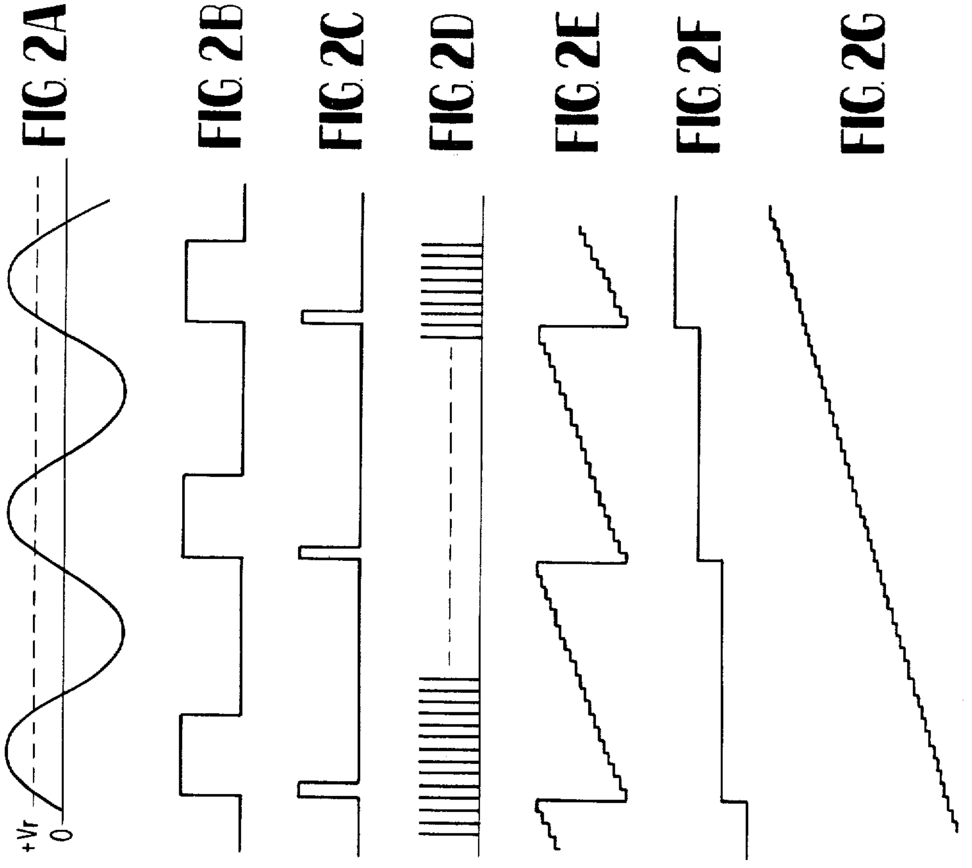

The input signal from the terminal 101 is passed through a high-pass filter 102, and the output signal on line 201 as shown in FIG. 2A of the same filter is then applied to a comparator circuit 104 to be compared therein with a d.c. voltage +V*r* introduced through an input terminal 103 of the circuit 104. The d.c. voltage +V*r* (indicated in FIG. 2A) is selected to satisfy the specifications set for the multifrequency signal receiver. More specifically, the voltage +V*r* is set at a value lower than the peak value of a signal having the lowest acceptable signal level but higher than the peak value of a signal having the highest level among the undetectably low level signals. The comparator circuit 104 delivers an output signal on line 202 having two levels as shown in FIG. 2B, which is in turn applied to a leading edge detector 105 which has differentiating and rectifying function and generates a series of output pulses on line 203 as indicated in FIG. 2C occurring at the leading edge or trailing edge of the signal on line 202. The detector 105 can be easily realized by a combination of flip-flops, inverters, and an AND gate.

The series of output pulses on line 203 has a repetition period equal to that of the high frequency signal on line 201, and is passed through a delay circuit 106 for obtaining a signal on line 204 to control the counting operation of a counter 108. The counter 108 counts clock pulses, as shown in FIG. 2D, applied to the input terminal 107, and the counted results (or contents) of the counter 108 are reset to zero every time the output signal on line 204 becomes "1". FIG. 2E graphically indicates the output signal on lines 205 obtained from the counter 108, the contents just before resetting of the output signal on lines 205 representing the duration of one cycle period of the input high frequency signal.

Assuming that 40 KHz is selected as the frequency of the clock pulses and that input frequencies 1209, 1336, 1477, and 1633 Hz are applied independently to the high-pass filter 102, the counted results in the counter 108 will be in the ranges of 32–34, 29–31, 26–28, and 24–25, in consideration of the ±2.0 percent allowable deviations in these frequencies.

Thus, when the results of pulse counting at the counter 108 just before resetting are found to be other than the above described ranges, this fact indicates that the high frequency included in the multifrequency input signal is different from the valid frequencies as decribed above.

The output signal on lines 205 is thus applied to a discrimination circuit 109 which delivers an output on line 206 of "0" when the signal 205 does not coincide with any one of the above described values, and delivers an output on line 206 of "1" when the signal on lines 205 coincides with one of the above described values. In the latter case, a two-bit signal on lines 207 representing the nominal value of the frequency is simultaneously generated. For instance, when the frequency is found to be 1209 Hz, the two-bit signal will be "00", while if the frequency is found to be 1336, 1477, and 1633 Hz, the two-bit signal on lines 207 will be "01", "10", and "11", respectively. Furthermore, when it is assumed that the signal on lines 205 is 30, the frequency belonging to the high frequency group in the input signal is expected to be 1336 Hz, whereby "1" and "01" are delivered as the output signals on line 206 and on lines 207, respectively. On the other hand, if the signal on line 206 is found to be "0", the other signal on lines 207 may be any insignificant value.

The discrimination circuit 109 of the above described nature can be easily constructed utilizing a read-only memory available in the market.

Since only the values of the signal on line 206 and on lines 207 just before the counter 108 is reset are significant, the signals on line 206 and on lines 207 are sent together with the output signal on line 203 of the leading edge detector 105 to a group of AND gates 110 and converted therein into signals on line 208 and on lines 209, respectively. The signal on lines 209 is then applied to a holding circuit 112. The holding circuit 112 may be composed of a conventional latch circuit, flip-flops, and the like, and has a function of holding a signal on lines 209 from the turning to "1" of the signal on line 203 until its restoration to "1". Accordingly, the output signals on lines 210 of the holding circuit 112 is equal to the signal on lines 209 of the value corresponding to one cycle period before. Whether the signal on lines 209 coincides with the signal on lines 210 or not is detected by a coincidence detecting circuit 113. That is, when both signals are coincident with each other, the output signal on line 211 of the detecting circuit 113 becomes "1", and when they are not, it becomes "0". The coincidence detecting circuit 113 can be easily constructed from an exclusive-OR circuit and an inverter.

The signals on line 211 and on line 208 are passed through an AND gate 111, and an output signal on line 212 is delivered from the AND gate 111. Furthermore, another AND gate 129 is inserted between the AND gate 111 and the counter 115 so that the counting operation of the counter 115 is stopped when the same counter is saturated as described hereinlater.

The output signal on line 212 from the AND gate 111 becomes a "1" once for every cycle of a preset input frequency. The holding circuit 112 and the coincidence detecting circuit 113 are provided for reducing the possibility of faulty operation caused by noise. This is achieved by confirming that the same frequency signal is continuously introduced into these circuits. For this reason, the circuits 112 and 113 may be omitted, when it is desired, without causing any adverse effect on the operation of the system.

Since the signal on line 212 becomes a "1" once for every cycle period of the input signal, how many periods of the sinusoidal wave are applied through the input terminal 101 can be easily found by simply counting in counter 115 the number of "1's" contained in the signal on line 212 as graphically illustrated in FIG. 2F. However, the AND gate 129 is inserted between the AND gate 111 and the counter 115 thereby to stop the counting operation when the counter 115 is saturated. When the signal 212 is "0" at the instants when the signal on line 203 becomes "1", or in other words, when the high frequency signal cannot be recognized to have any one of the preset dialing signal frequency components, the signal on line 213 becomes "1" and the counter 115 is thereby reset.

The counted results on lines 214 of the counter 115, the signals on line 208 and on lines 210 are all introduced into the input side of the readout commanding circuit 117. The readout commanding circuit 117 is a matrix which can be composed of a read-only memory available in the market. The readout commanding circuit 117 determines from the signal on lines 210 the value of the input frequency, and from the signal on lines 214 how many consecutive periods the input frequency signal has been applied, and thereby to determine the guard time as described hereinbefore. It should be noted that this function is one of the most important features of the present invention. In other words, according to the requirements for the multifrequency signal receiver, a signal within the tolerable frequency deviation with a sufficient level lasting for more than 24 ms is recognized as a valid multifrequency dialing signal. Table 1 indicates the number of periods of each preset frequency which can be contained in the 24 ms. As will be apparent from the Table 1, the guard times thus set for the nominal frequencies are somewhat different depending on the frequencies. However, the differences in this extent are well within the allowable range, and no disadvantageous effect is found in the operation.

Now assuming that the signal on line 208 is "1" and the signal on lines 210 is "01", the input signal is expected to be a sinusoidal wave of a frequency 1,336 Hz. When the signal on lines 214 indicative of the frequency of the input signal is assumed to be 33, the same input signal is consecutively received for about 24.70 ms. As a result, the readout commanding circuit 117, which is under the control of the counter 115, delivers a commanding signal on line 215 of "1" only in the four cases as shown in Table 2. The one cycle period of the commanding signal on line 215 determines the abovementioned guard time for the specific frequency, and the frequency of the signal on line 201 is determined as hereinafter described from the counted value in the counter 116 within the guard time.

Table 1

| Frequencies in high frequency group of the multi-frequency signal | Signal on line 210 | Periods within approx. 24 ms | Guard time |
|---|---|---|---|
| 1,209 Hz | 00 | 30 | 24.81 ms |
| 1,336 Hz | 01 | 33 | 24.70 ms |
| 1,477 Hz | 10 | 36 | 24.37 ms |
| 1,633 Hz | 11 | 40 | 24.50 ms |

Table 2

| Signal on line 208 | Signal on line 210 | Signal on line 214 |
|---|---|---|
| 1 | 00 | 30 |
| 1 | 01 | 33 |
| 1 | 10 | 36 |
| 1 | 11 | 40 |

On the other hand, the counter 116 continuously counts the clock pulses applied to the terminal 107 as graphically illustrated in FIG. 2G. A calculation as to how many pulses of the clock frequency 40 KHz can be included in the 33 cycle period time of a sinusoidal wave of 1,336 Hz under a specific frequency deviation reveals that the number is from 1,016 to 1,017 for a frequency deviation of −2.8 percent; from 1,008 to 1,009 for a frequency deviation of −2.0 percent; from 961 to 962 for a frequency deviation of +2.8 percent; and from 968 to 969 for a frequency deviation of +2.0 percent. From the foregoing it is apparent that a frequency deviation of ±2.0 percent can be clearly discriminated from that of ±2.8 percent. For instance, when the signal on line 215 is "1", signal on lines 210 is "01", and the signal on lines 216 is in a range of from 968 to 1009, the input frequency is judged to be the preset nominal frequency of 1,336 Hz with the deviation falling within ±2.0 percent.

The above described discriminating operation is carried out in a discrimination circuit 118 which may also be realized by a read-only memory. Two output signals on line 217 and on lines 218 are obtained from the discrimination circuit 118. The signal on line 217 indicates whether the value of the signal on lines 216 is within a predetermined range or not by a one bit signal. For instance, in the above described example, the signal on line 217 becomes "1" when the value of the signal on lines 216 is within a range of 968 to 1,009. On the other hand, the signal on lines 218 represents a frequency which is indicated in the above described example by "01". The signal on lines 210 may be used in itself as the output signal on lines 218.

The two inputs on line 217 and on lines 218 of the discrimination circuit 118 are applied to a holding circuit 119. In this case, the timing of the application (or writing) of these output signals into the holding circuit 119 may be adjusted by a signal on line 225 which is obtained by delaying the signal on line 215 in a delay circuit 120 for an amount sufficient to provide a discrimination in the discrimination circuit 118. The output signals of the discrimination circuit 118 are temporarily held in the holding circuit 119. In the case where the signal on line 217 becomes "0" with the signal on line 225 being "1", the input signal is ultimately judged to be none of the valid dialing signals, whereby the counters 115 and 116 are reset to zero by a signal on line 224.

An output signal on lines 220 from the holding circuit 119, which corresponds to the signal on lines 218, is then introduced into a decoder 123 together with a similar signal on lines 221 obtained from a low frequency processing circuit, thereby causing only one output corresponding to the single depressed push button among the sixteen push buttons to become "1" and all the remaining outputs being "0". When another output signal on line 219 from the holding circuit 119, which corresponds to the signal on line 217, and the similar signal on line 222 from the low frequency processing circuit are both in the "1" state, the output of an AND gate 128 is changed from "0" to "1", and thus the output from the AND gate 128 brings a monostable multivibrator 124 into the "1" state. The monostable multivibrator 124 is kept at the "1" state for a predetermined period of time which ordinarily lasts from 40 to 60 milliseconds so that a relay provided in the subsequent stage can be energized sufficiently. The monostable multivibrator 124 is not necessarily constructed as an analog type employing conventional resistors and capacitors but may be constructed as a digital type utilizing, for instance, a counter.

Only while the output signal on lines 223 of the monostable multivibrator 124 is in the "1" state, the output of the decoder 123 is taken out through AND gate 125 to the output terminals 126. Furthermore, the trailing edge (from "1" to "0") of the output signal on line 223 of the monostable multivibrator 124 is detected by a detecting circuit 127, and the output thereof is used for resetting the high frequency holding circuit 119 and the low frequency holding circuit 122 so that the both holding circuits are prepared for the arrival of the subsequent signals.

Although the structure and operation of the multifrequency signal receiver embodying the present invention have been described above, the receiver may be further modified so that the possibility of faulty operation due to the invalid signal is reduced or the clock frequency is further lowered. Such modifications of the receiver will now be described with reference to FIGS. 3 through 9. In one of the modifications, a circuit indicated in FIG. 3 is added to the receiver shown in FIG. 1.

Figure 3:
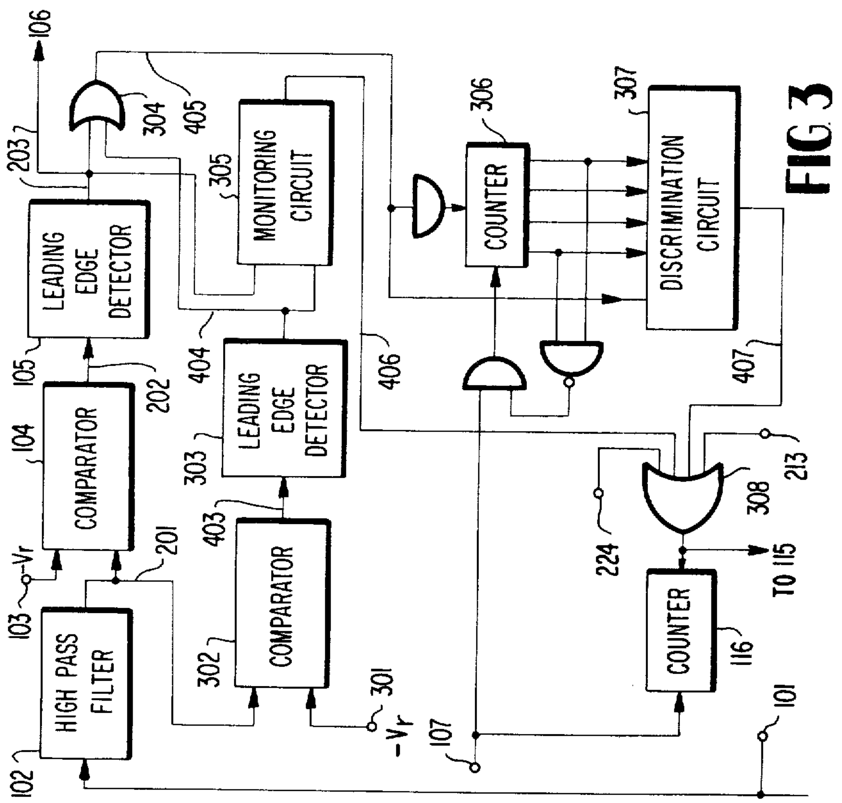
Figure 4A:
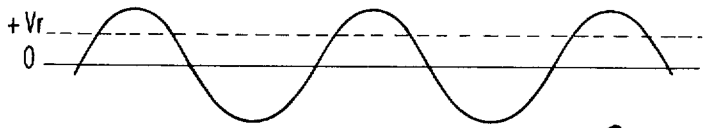
Figure 4B:
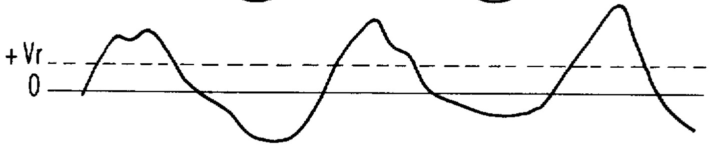

Referring to FIG. 3 and FIGS. 4A through 4K showing the waveforms for explaining the operation of this example, when the input signal is a multifrequency signal of preset frequencies, the signal on line 201 after separation by the high-pass filter 102 is a simple sinusoidal wave as shown in FIG. 4A. The input signal can be received correctly through the circuit as described hereinbefore with respect to the embodiment shown in FIG. 1. However, in case of pseudo-noise being received there still exists a possibility that the amplitude of the signal crosses the threshold value V*r* at a predetermined time interval as shown in FIG. 4B. In such a case, the receiving circuit as shown in FIG. 1 would receive the pseudo-noise as a dialing signal. When the pseudo-noise is a speech signal and, more particularly, that for a vowel, there is a great possibility of the above described faulty operation.

Figure 4C:
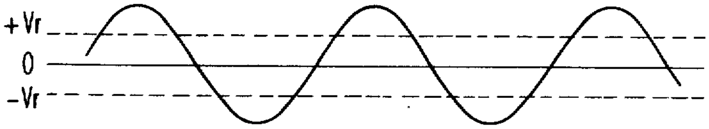

The above described faulty operation can be effectively eliminated by the provision of two symmetrical threshold values +V*r* and −V*r* as shown in FIG. 4C and by inspecting whether the signal on line 201 alternately crosses the two threshold values and the periods between the instants of crossing the two threshold values, respectively, are both within a predetermined marginal range.

Figure 4D:
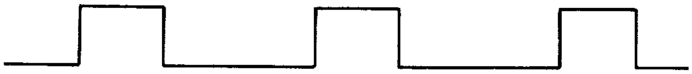
Figure 4E:
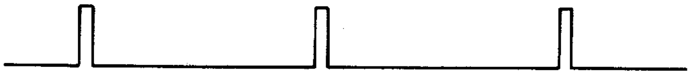
Figure 4F:
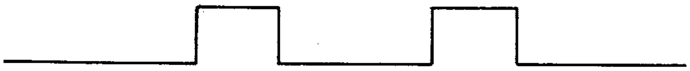
Figure 4G:
Figure 4H:
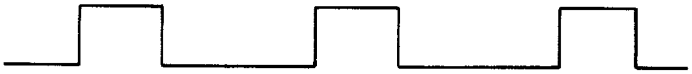
Figure 4I:
Figure 4J:
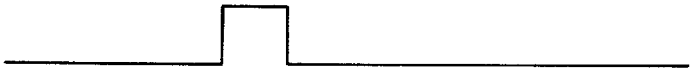
Figure 4K:
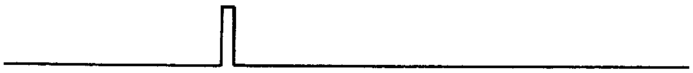

The circuit shown in FIG. 3 is so arranged that the above described provision and inspection can be thereby carried out. The signal on line 201 which has passed through the high-pass filter 102 is compared at a comparison circuit 104 with a threshold value +V*r* applied to the terminal 103, and is also compared in another comparison circuit 302 with another threshold value −V*r* applied through another terminal 301 so that outputs 202 (as shown in FIG. 4D) and 403 (as shown in FIG. 4F) are obtained, respectively. The outputs 202 and 403 are thereafter applied to leading (or trailing) edge detecting circuits 105 and 303, respectively and changed into signals on line 203 (FIG. 4E) and on line 404 (FIG. 4G) both having "1" pulses only at the leading edges (or trailing edges). In the case where a valid multifrequency signal has been supplied through the input terminal 101, the signals on line 203 and on line 404 will become "1" alternately, and the periods between respective "1" pulses will be both equal to that of a half cycle of the high frequency signal. On the other hand, when noise is applied to the input terminal 101, the signals on line 203 and on line 404 either do not alternately become "1", or, if the signals become "1" alternately the periods between the respective "1" pulses will not be constant and hence will not be equal to that of the a half cycle of the high frequency signal. For instance, when the signal on line 201 is as shown in FIG. 4B, the signals on line 202 and on line 403 will be as shown in FIGS. 4H and 4J, respectively, and the signals on line 203 and on line 404 will be as shown in FIGS. 4I and 4K, respectively.

Figure 5:
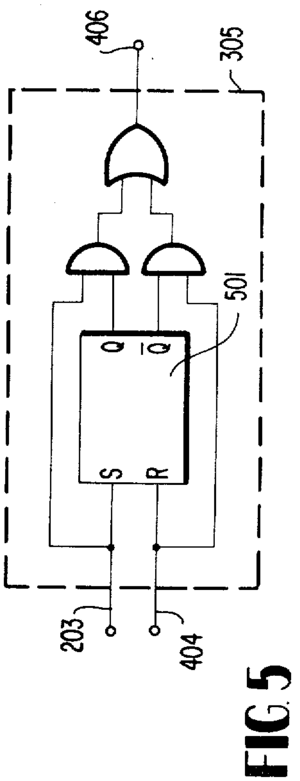
FIG. 5 is a diagram showing the construction in detail of a supervising circuit 305 in FIG. 3.

Thus, a monitoring circuit 305 is provided in the circuit shown in FIG. 3 to monitor whether the signals on line 203 and on line 404 are alternately "1". The circuit 305 delivers an output "0" when the signals on line 203 and on line 404 are alternately "1", and delivers an output "1" when either one of the signals is successively "1". An example of the monitoring circuit 305 is shown in FIG. 5 wherein a block 501 represents an ordinary reset-set flip-flop operating at the trailing edges of the input signal on line 203 or on line 404. It will be easily understood that the desired operation can be obtained by this circuit. Further description therefor will therefore be omitted.

Returning now to FIG. 3, the output signals on line 203 and on line 404 are then introduced into an OR circuit 304 which delivers an output signal on line 405 representing a period equal to one half cycle of a high frequency signal included in the multifrequency input signal. The circuit is further provided with a counter 306 for counting a series of clock pulses, and the counter 306 is reset each time the signal on line 405 becomes a "1". Thus, it will be apparent that the counted results obtained immediately before the resetting of the counter 306 represent the time period for a half cycle of the high frequency signal included in the multifrequency input signal. The number of pulses (when the clock frequency is 40 KHz) included in one half cycle period of the four high frequencies (falling within the deviation tolerance range of ±2.0 percent) included in the multifrequency signal are indicated as follows:

| | | | |
|---|---|---|---|
| 1,209 Hz | 16 - 17, | 1,336 Hz | 14 - 16, |
| 1,447 Hz | 13 - 14, | 1,633 Hz | 12 - 13. |

The values are discriminated by a discrimination circuit 307, and an output "1" is delivered as an output on line 407 therefrom when the number of pulses is not within the range from 12 to 17. Furthermore, a monitoring circuit may be provided for monitoring the fact that the counted results in the counter 306 just before the resetting are continuously within one of the above described ranges.

When one of the signals on line 406 or on line 407 thus obtained become "1", the input signal is not recognized as a nominal multifrequency signal. For this reason, the signals on lines 406, 407 and the signals on lines 213, 224 in FIG. 1 are all introduced into an OR circuit 308, and the counter 116 is reset by the output of the OR circuit 308. In this case, the counter 115 in the circuit in FIG. 1 is also reset.

When the circuit shown in FIG. 3 is added to the circuit shown in FIG. 1, the possibility of causing faulty operation due to the pseudo signals can be substantially eliminated, improving the reliability of the multifrequency signal receiver.

Another modification wherein the frequency of clock pulses can be further reduced will now be described.

In order that the input frequency is judged in the frequency discriminating circuit 109 in FIG. 1 to deliver the discrimination pulse on line 207, the difference in the number of clock pulses counted during one-cycle periods of the input frequencies must be greater than one. To satisfy this requirement, the frequency of the clock pulses must be higher than approximately 40 KHz. The number of clock pulses counted within one-cycle periods of the high frequency group: 1,209, 1,336, 1,447 and 1,633 Hz (within the tolerable frequency deviation of ±2.0 percent) are in the range of 32–34, 29–31, 26–28, and 24–25, respectively, as indicated hereinbefore. In the circuit shown in FIG. 1, any reduction of the clock frequency from the above-mentioned 40 KHz would cause overlapping between the ranges of the counted numbers of the clock pulses during a one-cycle period of the frequencies contained in the multifrequency input signal, and hence frequency discrimination becomes impossible.

However, the above-mentioned fact is true only for the high-frequency group contained in the multifrequency input signal. For the low-frequency group, even if clock pulses of 20 KHz is utilized, differences can be obtained between the counted numbers of the clock pulses during one-cycle period of the low frequency group. More specifically, the number of counted clock pulses at 20 KHz during one-cycle period of the low-frequency group is as follows: 697, 770, 852, and 941 Hz (at an allowable frequency deviation of ±2.0 percent) fall within the range of 28–30, 25–27, 23–24, and 20–22, respectively, and no overlapping is caused between these ranges.

Therefore, it is not advantageous to keep the clock frequency at a higher value only for the necessity of the discrimination of the high frequency group, and the clock frequency should preferably be kept at a value lower and the discrimination of the high frequency group be carried out based on the numbers of the clock pulses counted during two-cycle period of the higher frequency group.

Figure 6:
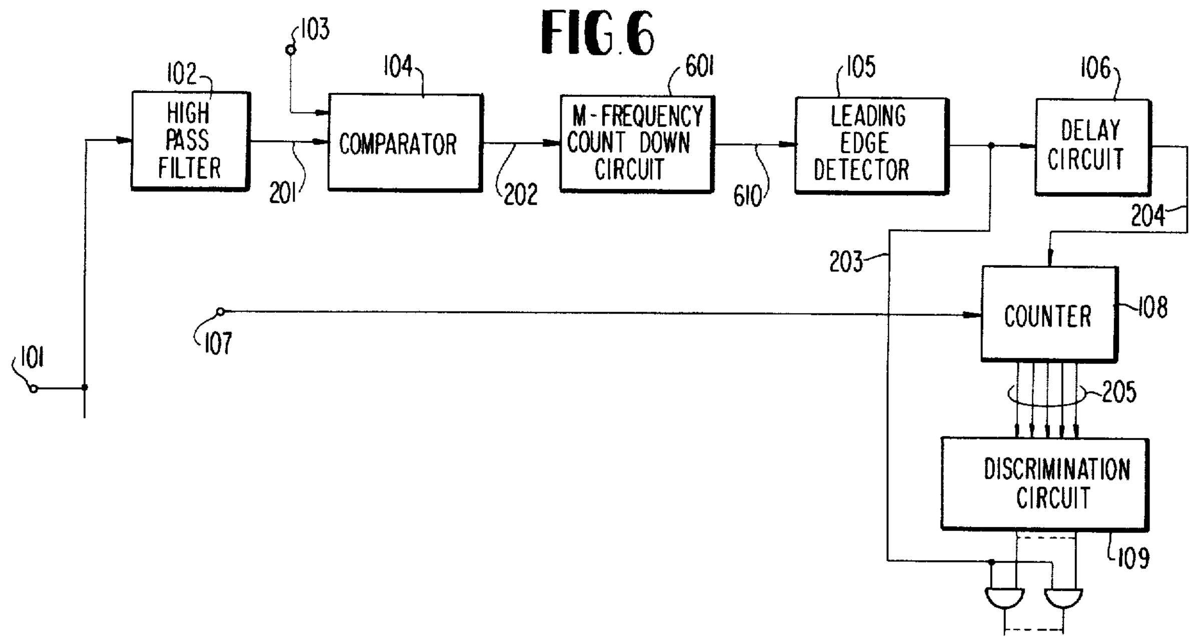
FIG. 6 is a diagram of an example of a circuit which can reduce the clock frequency in the multifrequency signal receiver shown in FIG. 1.

FIG. 6 indicates a circuit for carrying out the above described principle for the high-frequency group, and the waveforms in various parts in the circuit are indicated in FIGS. 7A through 7E for the convenience of the explanation.

Figure 7A:
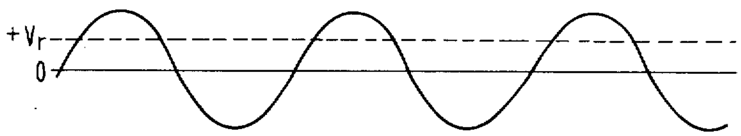
FIGS. 7A to 7E are diagrams showing waveforms at various parts of the circuit shown in FIG. 6.
Figure 7B:
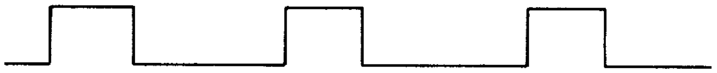
Figure 7C:
Figure 7D:
Figure 7E:
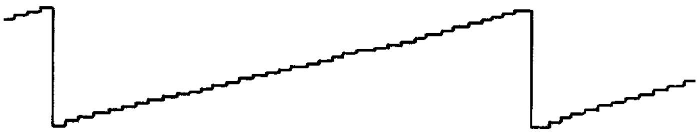

In the circuit, a multifrequency signal introduced in the input terminal 101 is passed through a high-pass filter 102 thereby to pick up only a high-frequency group signal on line 201 (shown in FIG. 7A). The high-frequency group signal on line 201 is then compared with a d.c. threshold value $+Vr$ introduced through a terminal 103 in a comparator circuit 104, and an output signal on line 202 as shown in FIG. 7B is obtained therefrom. The circuit shown in FIG. 6 is further provided with an M-frequency count down circuit 601 (M is a positive integer of, for instance, 2) through which the output signal on line 202 is converted into an output signal on line 610 as shown in FIG. 7C. The output signal on line 610 is thereafter processed in a quite similar manner as in the circuit shown in FIG. 1 with only difference residing in that the counter 108 counts the clock pulses between the detector 105 output pulses shown in FIG. 7D contained in the two-cycle period of the high-frequency group signal as graphically illustrated in FIG. 7E. Because of the above described procedure, the clock pulses of 20 KHz are used as effectively as those of 40 KHz, and the discrimination in the discriminating circuit 109 of the four high-frequency group signals is thereby made possible. The required frequency of the clock pulses can thus be reduced by inserting the frequency count down circuit 601 only in the high-frequency processing circuit branch without causing any disadvantageous effect in the entire operation of the circuit.

In the above described circuit, an example wherein a frequency count down circuit of $M = 2$ is inserted only in the high-frequency processing circuit branch has been described. However, the embodiment is not limited to the above described example, and a frequency count down circuit may be inserted in each of the circuit branches for processing the high and low frequency groups whenever it is advantageous depending on the relation between the guard time, frequencies of the low-frequency group signals and the high-frequency group signals, and the tolerable frequency deviation ranges for these signals.

Another embodiment wherein the frequency of the clock pulses is further lowered will next be described.

Since the lowest tolerable frequency of the clock pulses to permit the frequency discrimination in the discrimination circuit 118 within the guard time defined for receiving the multifrequency signal is approximately 10 KHz, it is desirable to lower the frequency of the clock pulses down to this value.

Figure 8:
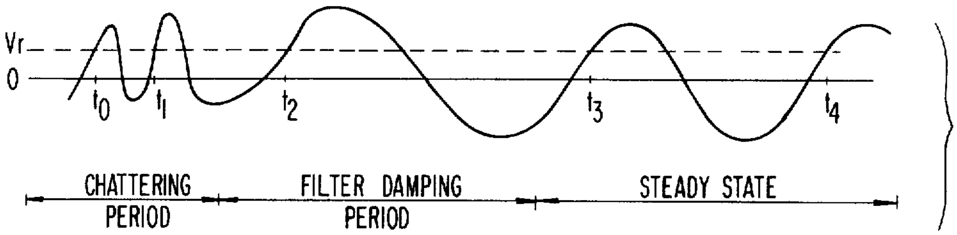
FIG. 8 is a diagram showing an output waveform of a filter viewed at the leading wave portion of the multifrequency signal.

On the other hand, the frequency of the clock pulses can be reduced by the employment of the frequency count down circuit as described above, and the effect thereof is greater when the frequency dividing ratio M is selected to be a greater value. However, an excessively greater frequency dividing ratio M may cause undesirable lengthening in the signal detecting time. FIG. 8 is a waveform diagram for explaining this relationship, and therein indicates the transient response of the output signal on line (201 in FIG. 1) from the high-pass filter 102 at the leading waveform portion of the multifrequency signal. For the convenience of the description, it is assumed that $M = 4$.

At the leading waveform portion of the multifrequency signal, there exists a transient portion including chattering and the like, and furthermore, since a considerable amount of time is needed for the output of a filter to dampen to the steady state, the output of the filter is varied as shown in FIG. 8. Assuming that the counter 108 is counting the clock pulses falling within the four-cycle period starting from $t_o$ to $t_4$ of the high-frequency signal, the discriminating circuit 109 in FIG. 6 delivers an output at the time point $t_4$. Thus, the discrimination output may be discarded. In reality, the effective counting is started at the time point $t_4$.

However, as is apparent from the observation of FIG. 8, the output signal is brought into steady state at the time point $t_3$, and one-cycle period extending from $t_3$ to $t_4$ is wasted in the above described procedure, lengthening the time required for detecting the frequency of the input signal. In the above description, it is assumed that the counter counts clock pulses falling within the period of from $t_o$ to $t_4$, a three cycle period starting at $t_3$ is wasted thereby further lengthening the detecting time. Thus it will be apparent that this tendency is intensified when the frequency dividing ratio M is increased.

Figure 9:
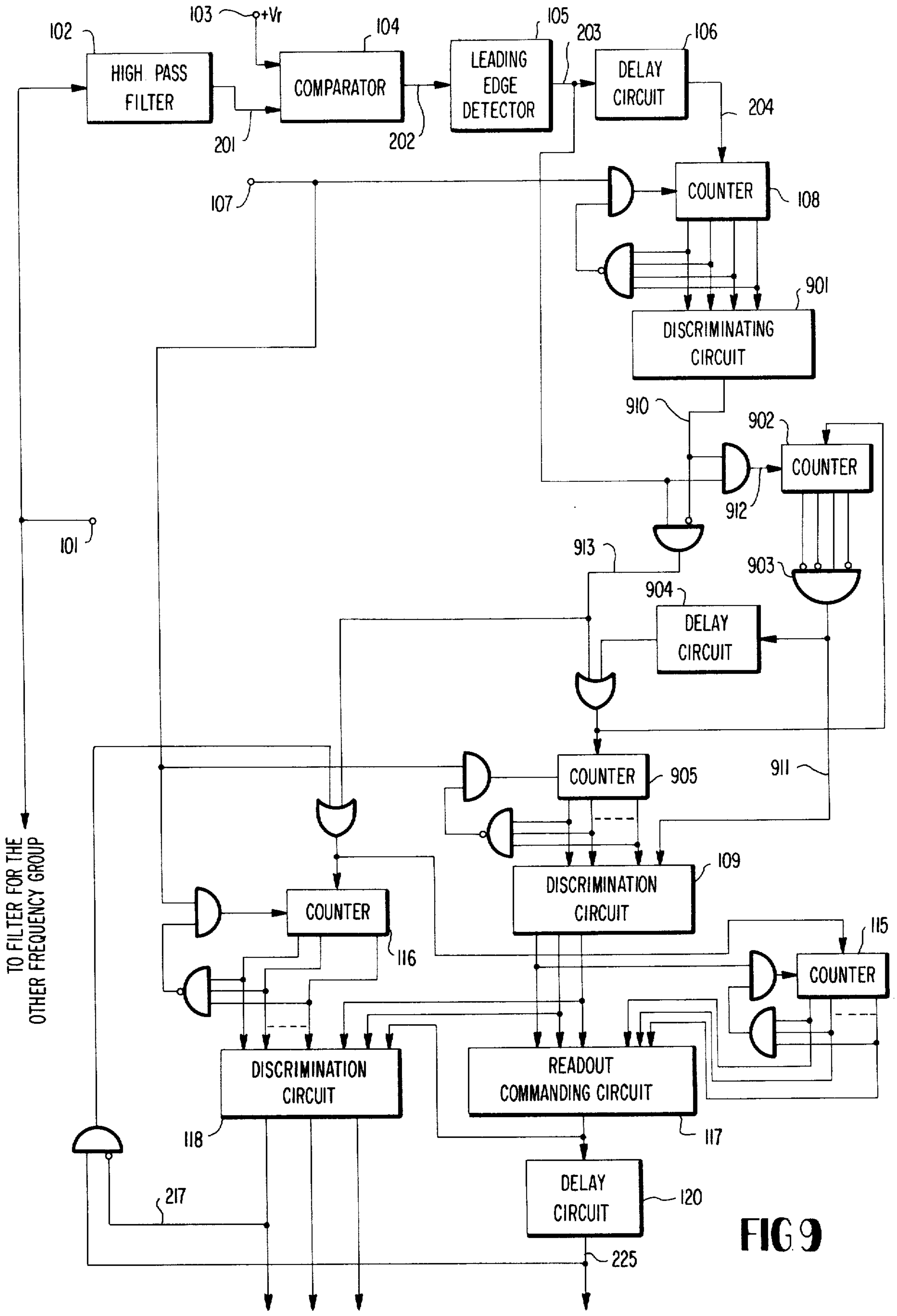
FIG. 9 is a circuit diagram showing a principal part of another example of the multifrequency signal receiver wherein the frequency of the clock pulses can be further reduced.

An embodiment of the circuit for eliminating the above-mentioned drawback is indicated in FIG. 9. In this example, like structural elements are denoted by like reference numerals. In operation, a counter 108 counts clock pulses applied through a terminal 107, and the counting operation is reset every time the output signal on line 203 from a circuit 105 detecting the leading waveform portion of the signal on line 202 is received. The frequency of the clock pulses is set at comparatively low frequency, e.g., 10 KHz. The number of the clock pulses counted at the counter 108 immediately before resetting is discriminated in a discriminating circuit 901. Since the frequency of the clock pulses is set at a low value, the discriminating circuit 901 cannot determine the exact value of frequency of the signal on line 201. However, the discriminating circuit can determine whether the frequency is within the tolerable region. In a numerical example wherein the clock frequency is selected to be 10 KHz, the numbers of the clock pulses counted during one-cycle period of the high-frequency group signals, i.e., 1,209, 1,336, 1,477 and 1,633 Hz will be 8 or 9, 7 or 8, 6 or 7, and 5 or 6, respectively. Thus, the output signal on line 910 of the discriminating circuit 901 is "1" when the number of the clock pulses counted at the counter 108 is in a range of 5 to 9, and is "0" when it is out of the above described range. A counter 902 counts the output pulses on line 912 of an AND gate receiving the output signal on line 910 and a signal on line 203, whereby the frequency of the signal on line 201 delivered from the filter 102 is determined from the result of counting by the counter 902. A gate 903 detects that the counting result is for instance 4 and delivers an output signal on line 911. A block 904 designates a delay circuit.

During the above-described operation, a counter 905 continues to count the clock pulses, since the result of counting at the counter 905 viewed at the moment when the output signal on line 911 is delivered corresponds to the number of the clock pulses counted within the four-cycle period of the signal on line 201, the result is applied to a discriminating circuit 109 thereby to determine the frequency in the multifrequency signal. Operations of other parts in the circuit shown in FIG. 9 are quite similar to those described with reference to FIG. 1. It should be noted that the holding circuit 112 and the coincidence detecting circuit 113 both provided in FIG. 1 are omitted in the circuit of FIG. 9.

Referring again to FIG. 8, the multifrequency signal received in the time periods from $t_o$ to $t_1$, from $t_1$ to $t_2$, and from $t_2$ to $t_3$ cannot be a normal multifrequency signal as described hereinbefore. For this reason, the output signal on line 910 from the discriminating circuit 901 becomes "0" and the signal on line 913 becomes "1" when the signal on line 203 is delivered, and the counters 902, 905, 115, and 116 are all reset to zero thereby to newly start counting the following inputs. Thus, even if the counters 905 and 116 start counting the clock pulses at the time point $t_o$, the results of counting are reset at the instants $t_1$, and also at $t_2$ and $t_3$. This means that the effective counting is started in each of the counters at $t_3$. Thus, all of the time intervals wherein the input signal is in the steady state are utilized for detecting the multifrequency signal, whereby the lengthening of the frequency determining period is prevented.

Stated briefly, in the circuit of FIG. 9, rough discrimination is performed in the discriminating circuit 901 during every one-cycle period of the input signal, and when it is judged from the results of the rough discrimination that there is no possibility of the input signal being a multifrequency signal, all of the counters are reset for newly starting the counting operations. When the discriminating circuit 901 judges that the input signal is possibly a multifrequency signal, the clock pulses are counted within the M-cycle period (in this example, M is assumed to be 4) of the input signal for precisely determining the frequency of the input signal. With the above described procedure, the frequency of the clock pulses can be reduced without lengthening the time period needed for frequency determination.

As a modification of the circuit shown in FIG. 9, the frequency count down circuit may be inserted between the comparison circuit 104 and the circuit 105 for detecting the trailing edge of the input signal or just after the detecting circuit 105 whenever the requirements for the receiver permits such an insertion. Furthermore, the discrimination circuit 901 may be so constructed that the output signal on line 910 thereof is not limited to either of "1" or "0", but of a nature allowing to indicate a possible value of the frequency. In addition, the abovementioned holding circuit 112, coincidence detecting circuit 113, and the like may be provided for one or both of the discrimination circuits 901 and 109. Alternatively, the counters 116 and 905 indicated in the circuits of FIGS. 1 and 9 may be replaced by accumulators and the counted results in the counters 108 and 905 may be thereby accumulated. In the above description, only the circuit for processing the high-frequency group signal has been described with respect to various examples thereof. However, it will be apparent that the circuit for processing the low-frequency group signal can be constructed in the similar manner, and hence the detailed description thereof is omitted for the simplicity of the description.

In the multifrequency signal receiver according to the present invention, the discrimination of whether the frequency deviation of an input signal is within a tolerable region defined by the requirements is carried out utilizing the guard time, whereby a significant merit of reducing the frequency of the clock pulses can be obtained without sacrificing the precision of the frequency discrimination. As a result of the reduction of the clock frequency, one-cycle period of the clock pulses is lengthened, eliminating adverse effects of disturbance signals (such as an insufficiently suppressed signal of the other frequency group and noise) and simpify the construction of the filters. The multifrequency signal receiver can be formed of digital circuit elements, thereby facilitating the production, adjustment, and maintenance and allowing the production in the form of LSI. When the input signal is subjected first to analog-to-digital (A/D) conversion, it is further possible that the entire receiver is constructed and operated in a digital manner. Furthermore, a single read-only memory for all the discriminating circuits can be used in a multiplex manner, facilitating the miniaturization and cost reduction.

Although the invention has been described with respect to an embodiment for processing a multifrequency signal presently used in the telephone transmitting system and comprising a low-group frequency (697, 770, 852, or 941 Hz) and a high-group frequency (1,209, 1,336, 1,477 or 1,633 Hz), the invention is not necessarily limited to such use. It finds application in the detection of a multi-frequency signal in general. Furthermore, the invention has been described with particular respect to the specification set by the Nippon Telegraph & Telephone Public Corporation, it will be apparent that the system is applicable to any other multifrequency signal receiver as well.

What is claimed:

1. A multifrequency signal receiver for processing a multifrequency dialing signal for telephone switching, comprising means for separating the multifrequency signal into component frequency groups, means for discriminating a frequency in each of the frequency groups, characterized by comprising: a comparison circuit for comparing an output signal from a filter for each of the frequency groups with a predetermined first d.c. threshold voltage to determine whether the output signal is of a sufficient level and for delivering a binary signal if said output signal exceeds said first threshold voltage; a leading edge detecting circuit for detecting the leading edge of the output binary signal from the comparison circuit to deliver pulses upon each detection; a source of clock pulses; a first counter for counting the clock pulses under the control of the output from the leading edge detecting circuit; a first discriminating circuit for discriminating in response to the output from the first counter whether the output signal from the filter lies in one of the frequencies belonging to the specific frequency group; a second counter for measuring the number of unit periods of the output signal from the filter based on the output of the first discriminating circuit and the output of the leading edge detecting circuit; a third counter for counting the clock pulses; a read-out commanding circuit for judging the lapse of a predetermined guard time period from the output of the first discriminating circuit and the output of the second counter, and for delivering an instruction for reading out the counted values in the third counter; a second discriminating circuit for reading out the counted values in the third counter every time the read-out instruction is delivered and for determining whether the frequency deviation of the output signal from the filter is in a predetermined tolerable range; and a decoder connected to the output of said second discriminating circuit, whereby the frequency deviation of the output signal from the filter is determined to be in the tolerable range based on the guard time specified by predetermined receiving requirements said decoder producing an output signal once said predetermined receiving requirements have been met.

2. A multifrequency signal receiver as set forth in claim 1 further comprising a second comparison circuit provided in parallel with the first comparison circuit for comparing the output signal from the filter with a second d.c. threshold voltage of a magnitude equal to and of a polarity opposite to those of the first d.c. threshold voltage; a second leading edge detecting circuit for detecting the leading edge of the output of the second comparison circuit; a monitoring circuit for monitoring whether the outputs from the first and the second leading edge detecting circuits are delivered alternately or not said monitoring circuit resetting said third counter if the outputs are not delivered alternately; a fourth counter for counting the clock pulses under the control of the outputs from the first and second leading edge detecting circuits; and a third discriminating circuit for discriminating in response to the output of the fourth counter whether the frequency of the output signal from the filter is one of the frequencies belonging to the specific group.

3. A multifrequency signal receiver as set forth in claim 1 wherein one of said means for discriminating a frequency in one of the frequency groups comprises a frequency count down circuit inserted between said first comparison circuit and the leading edge detecting circuit.

4. A multifrequency signal receiver comprising means for separating the multifrequency signal into component frequency groups, means for discriminating a frequency in each of the frequency groups, characterized by comprising: a comparison circuit for comparing an output signal from a filter for each of the frequency groups with a predetermined d.c. threshold voltage for determining whether the output signal is of a sufficient level required for a dialing frequency signal belonging to the specific frequency group to deliver a binary signal depending on the results of comparison; leading edge detecting circuit for detecting the leading edge of the output binary signal from the comparison circuit; a source of clock pulses; a first counter for counting the clock pulses under the control of the output from the leading edge detecting circuit; a first discriminating circuit for delivering output pulses in response to the output from the first counter only when there is a possibility that said output signal from the filter is one of the frequencies belonging to the specific frequency group; a second counter for counting the number of successive unit periods of the output signal from the filter based on the output of the leading edge detecting circuit only when the pulses are delivered from said first discriminating circuit; third counter for counting the clock pulses; a detecting circuit for delivering a reset signal to the third counter every time the counted value of the second counter reaches a predetermined value representing the duration of successive unit periods of the filter output based on the output of the leading edge detecting circuit in which the clock pulses are counted by the third counter; a second discriminating circuit for judging in response to the output of the third counter whether the output signal from the filter is one of the frequencies belonging to the specific frequency group; a fourth counter for counting the number of successive unit periods of the output signal from the filter based on the discrimination result of the second discriminating circuit and the output from said leading edge detecting circuit; a fifth counter for counting the clock pulses; a read-out commanding circuit for judging the lapse of a predetermined guard time from the discriminated results of the second discriminating circuit and the counted results of the fourth counter to deliver an instruction for reading out the counted values in the fifth counter; a third discriminating circuit for reading out the counted values in the fifth counter upon delivery of the read-out instruction and for discriminating whether the frequency deviation of the output signal from the filter is within a tolerable range; a decoder connected to the output of said third discriminating circuit and means for resetting said fourth, fifth, second, and third counters if no output is delivered from the first discriminating circuit upon delivery of an output from the leading edge detecting circuit, said decoder producing an output signal once predetermined receiving requirements have been met.

* * * * *

UNITED STATES PATENT AND TRADEMARK OFFICE

CERTIFICATE OF CORRECTION

PATENT NO. : 3,917,912

DATED : November 4, 1975

INVENTOR(S) : Kunihiko NIWA

It is certified that error appears in the above-identified patent and that said Letters Patent are hereby corrected as shown below:

IN THE ABSTRACT:

| | | |
|---|---|---|
| | Line 11, | delete "sinal" and insert -- signal -- |

IN THE SPECIFICATION:

| | | |
|---|---|---|
| Column 2, | line 63, | delete "unequalty" and insert -- unequality -- |
| Column 3, | line 64, | after "frequency of" insert -- the -- |
| Column 4, | line 12, | delete "4a, 24dB" and insert -- of a -24 dB -- |
| | line 13, | delete "29dBm" and insert -- -29dBm -- |
| Column 5, | line 4, | delete "4G" and insert -- 2G -- |
| | line 53, | after "has" insert -- a -- |
| Column 6, | line 40, | delete "signal" and insert -- signals -- |
| Column 8, | line 54, | delete "inputs" and insert -- outputs -- |
| Column 10, | line 27, | after "alternately" insert a comma |
| | line 28, | delete "the" (first occurrence) |
| Column 14, | lines 67 and 68 | delete "simpify" and insert -- simplify -- |

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*